United States Patent [19]

Barrett et al.

[11] Patent Number: 5,331,561
[45] Date of Patent: Jul. 19, 1994

[54] ACTIVE CROSS PATH POSITION CORRELATION DEVICE

[75] Inventors: William A. Barrett, Shorewood; Donald G. Krantz, Eden Prairie, both of Minn.

[73] Assignee: Alliant Techsystems Inc., Hopkins, Minn.

[21] Appl. No.: 872,497

[22] Filed: Apr. 23, 1992

[51] Int. Cl.⁵ .......................... G06G 7/64; G08G 1/16
[52] U.S. Cl. .................... 364/447; 364/424.01; 364/460; 342/95; 340/903
[58] Field of Search .............. 364/447, 424.02, 460, 364/461, 443; 342/29, 41, 455, 456, 95; 180/170; 340/901, 902, 903

[56] References Cited

U.S. PATENT DOCUMENTS

| | | | |
|---|---|---|---|
| 4,328,545 | 5/1982 | Halsall et al. | 364/424.02 |
| 4,578,757 | 3/1986 | Stark | 364/461 |
| 4,626,995 | 12/1986 | Lofgren et al. | 364/424 |
| 4,703,429 | 10/1987 | Sakata | 364/426 |
| 4,757,450 | 7/1988 | Etoh | 364/426 |
| 4,802,096 | 1/1989 | Hainsworth et al. | 364/461 |
| 4,853,863 | 8/1989 | Cohen et al. | 364/460 |
| 4,855,915 | 8/1989 | Dallaire | 364/424.02 |
| 4,905,151 | 2/1990 | Weiman et al. | 364/424.02 |
| 4,939,651 | 7/1990 | Onishi | 364/424.02 |
| 5,053,979 | 10/1991 | Etoh | 364/565 |
| 5,155,684 | 10/1992 | Burke et al. | 364/424.02 |
| 5,163,004 | 11/1992 | Rentz | 364/460 |

*Primary Examiner*—Thomas G. Black
*Assistant Examiner*—Tan Q. Nguyen
*Attorney, Agent, or Firm*—Merchant, Gould, Smith, Edell, Welter & Schmidt

[57] ABSTRACT

A system guides a vehicle along a predefined path by correlating vehicle side range profiles. A lead vehicle gathers side range data using active radiation sources such as light emitting diodes. A microprocessor-based system on board the lead vehicle stores the data into records of a database file, tagging each record to indicate a relative position along the path when the lead vehicle obtained the data. A system on board a follower vehicle gathers its own side range data and also generates a side range profile for the follower vehicle. The follower vehicle's system receives by radio communication the side range profiles from the lead vehicle and, using the tagging information, correlates these profiles with the follower vehicle side range profiles at appropriate points along the path. As a result of the correlation, the follower vehicle's system outputs commands to actuators coupled to the vehicle's steering system, throttle, and braking system to control the vehicle's motion so that the vehicle traverses the predefined path.

28 Claims, 9 Drawing Sheets

ACTIVE CROSS PATH POSITION CORRELATION DEVICE

FIELD OF THE INVENTION

The present invention relates to an apparatus for actively correlating position data to control the motion of a vehicle.

BACKGROUND OF THE INVENTION

Controlling vehicles which do not contain human operators presents many challenging obstacles. The problem involves, in one case, having a convoy of vehicles following a lead vehicle. The lead vehicle contains a human operator and sends position data to the follower vehicles as the lead vehicles travels down a road. The follower vehicles do not require human operators; they receive the position data from the lead vehicle and must be able to use that data in maintaining a correct path along the road.

Another example of the problem involves a vehicle with a human operator being driven down a road as sensors on board the vehicle gather position information. The position data is stored in a data storage device, such as a floppy disk. Subsequent to the lead vehicle's trip, the position data may be loaded into other vehicles which then use the position data to travel the same path as the lead vehicle without requiring human operators.

A number of different systems have been developed in an attempt to control vehicles without requiring human operators. These systems include the following.

A radio frequency navigation grid utilized three stationary transmitters to control a vehicle's motion within an area defined by the locations of the transmitters. The transmitters included a master transmitter and two slaves. A receiver on board a lead moving vehicle sensed the phase relationships of the arrival of the signals transmitted from the three stations. The lead vehicle recorded these phase relationships while traveling down a particular path within the defined area. During subsequent retrace drives by vehicles without operators, the real-time received phase relationships were compared to the stored phase relationships from the lead vehicle. The retrace vehicle was then commanded to move in the direction that minimized the differences between the real time signal and the stored phase relationships. This system had an error such that a retrace vehicle could follow the original path to within a few feet. An implementation of the system, the Kaman Sciences System, was limited to approximately a 5×5 kilometer area as outlined by the three transmitters.

A ring laser gyro system, developed by Honeywell, Inc. Systems and Research Center in cooperation with the Advanced Systems Center of Honeywell's Defense Systems Division, determined waypoints along a driven path using a ring-laser-gyro-based inertial navigator. During a training drive by a vehicle, the system recorded the waypoints. After the completion of the learning path drive, the vehicle retraced the learned path by comparing its real-time, inertially-derived location with the previously recorded waypoints. The system caused the vehicle to move in a direction so as to minimize the difference obtained by the comparison. This system had a typical error of approximately one foot over a path of approximately 1000 feet and suffered from an unbounded error growth.

A pre-positioned target plaques system used coded plaques similar to the universal bar codes used by supermarkets. The coded plaques were placed at various locations along a path or around a work area in which an unmanned vehicle was to operate. A scanning laser in the vehicle scanned over the coded plaques and identified each by its unique code. Based on the angle of the laser beam and the range to the target plaque, the system determined the location of the vehicle from the laser readings. A limitation of this system was the requirement of markers along the desired path.

An embedded wire system used a wire or similar path marker embedded in the roadway to guide a vehicle. Sensors mounted in the front of the vehicle sensed the vehicle's position relative to the embedded marker, and the system guided the vehicle based upon this information. This system had been discussed for many years as part of an automated highway system. A major factor with this system was the high cost of modifying highways to include the embedded wire.

All of the systems described above have certain limitations which have created a need for a new solution to the problem. Systems which required external markers, such as the embedded wire or coded plaques, restricted the vehicle's motion to a specific path or area. Likewise, the system that used a navigation grid had a limited area in which to operate and required external transmission stations. The ring laser gyro system was less limited in terms of the area in which it may have been used; however, the system had significant errors which tended to grow larger over a longer path, which inherently restricted the range of the system.

SUMMARY OF THE INVENTION

The present invention solves the problems described above by utilizing correlation techniques to compare position data gathered by a follower (subsequent) vehicle with position data received from a lead (initial) vehicle and to control the follower vehicle based upon the results of this correlation so that it tracks the lead vehicle's path. The lead vehicle gathers position data using on-board active radiation sources, such as light emitting diodes, as it traverses a road. A system on-board the lead vehicle creates a data file of this position information and tags each record in the data file to indicate the relative position along the road at which the lead vehicle gathered the data. The lead vehicle's system transmits the data to a follower vehicle.

The follower vehicle gathers its own position information and its system compares this information with the position information in the data file sent by the lead vehicle. The tagging of the records indicates to the follower the time (location) at which the system should correlate gathered position data with position data in a particular record of the data file. The follower vehicle's system continuously correlates gathered data with received position data to control the follower vehicle so that it tracks the lead vehicle along the desired path. This continuous process of correlation prevents both large position errors and the increasing of position errors over time.

DETAILED DESCRIPTION OF THE PREFERRED EMBODIMENT

In the following detailed description of the preferred embodiment, reference is made to the accompanying drawings which form a part hereof and in which is shown by way of illustration a specific embodiment in which the invention may be practiced. This embodiment is described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

OVERVIEW

Figure 1A:
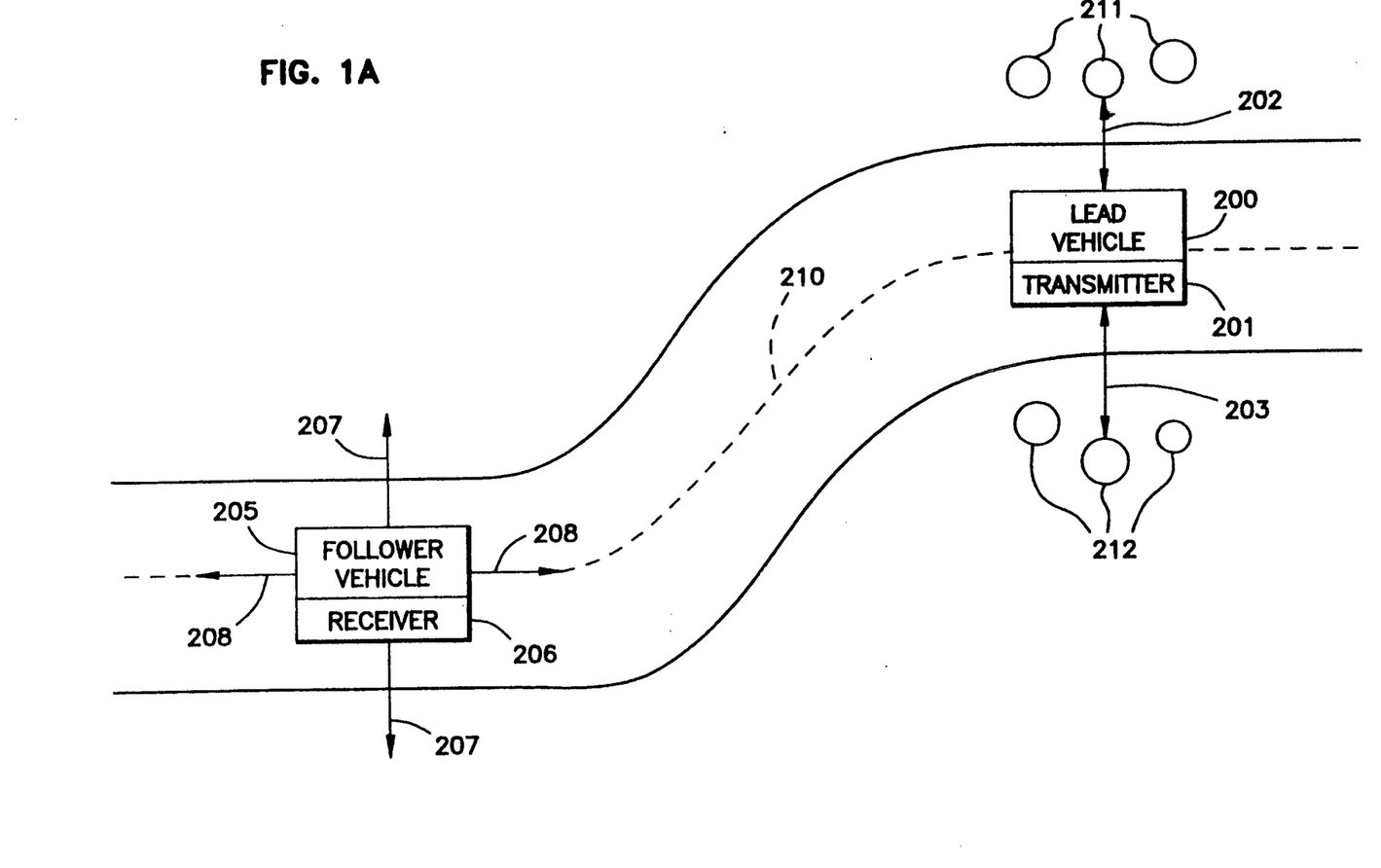
FIG. 1A is an illustration of the problem solved by the present invention, showing a follower vehicle using position data received from a lead vehicle in order to follow the lead vehicle's path.

FIG. 1A is a high-level illustration of a scenario in which the present system is shown in use. The system allows an unmanned follower vehicle 205 to receive position data from a lead vehicle 200, which is typically driven by a human operator, so that the follower vehicle may correlate the received data with its own gathered data and traverse the same predefined path 210 as the lead vehicle. The lead vehicle 200 has sensors mounted preferably on both sides of the vehicle. The sensors periodically measure distances 202 and 203 between the vehicle and objects 211 and 212 on either side of the vehicle. In addition to gathering this side range data, the lead vehicle records its relative position along path 210 for each of the side range data points. The lead vehicle includes a transmitter 201 for transmitting this side range profile position data to the follower vehicle 205.

The follower vehicle includes a receiver 206 for receiving position data from the lead vehicle as it simultaneously traverses path 210 behind the lead vehicle. The follower vehicle also includes sensors for gathering side range data. The follower vehicle correlates the gathered side range data with the position data received from the lead vehicle. Since the lead vehicle has also transmitted position data representing distance along the path 210, the follower vehicle will know the point along the path at which it should attempt to correlate the side range data. As a result of the correlation, the follower vehicle may determine if it has drifted from path 210 or is traveling too slow or fast. The follower vehicle may then output correction signals to actuators coupled to its steering system, throttle, and braking system in order to control side-track motion 207 and along-track motion 208 of the vehicle and thus maintain its position along path 210. Furthermore, the correlation prevents errors from increasing over time because the follower vehicle is continuously correlating new gathered data with data received from the lead vehicle.

Figure 1B:
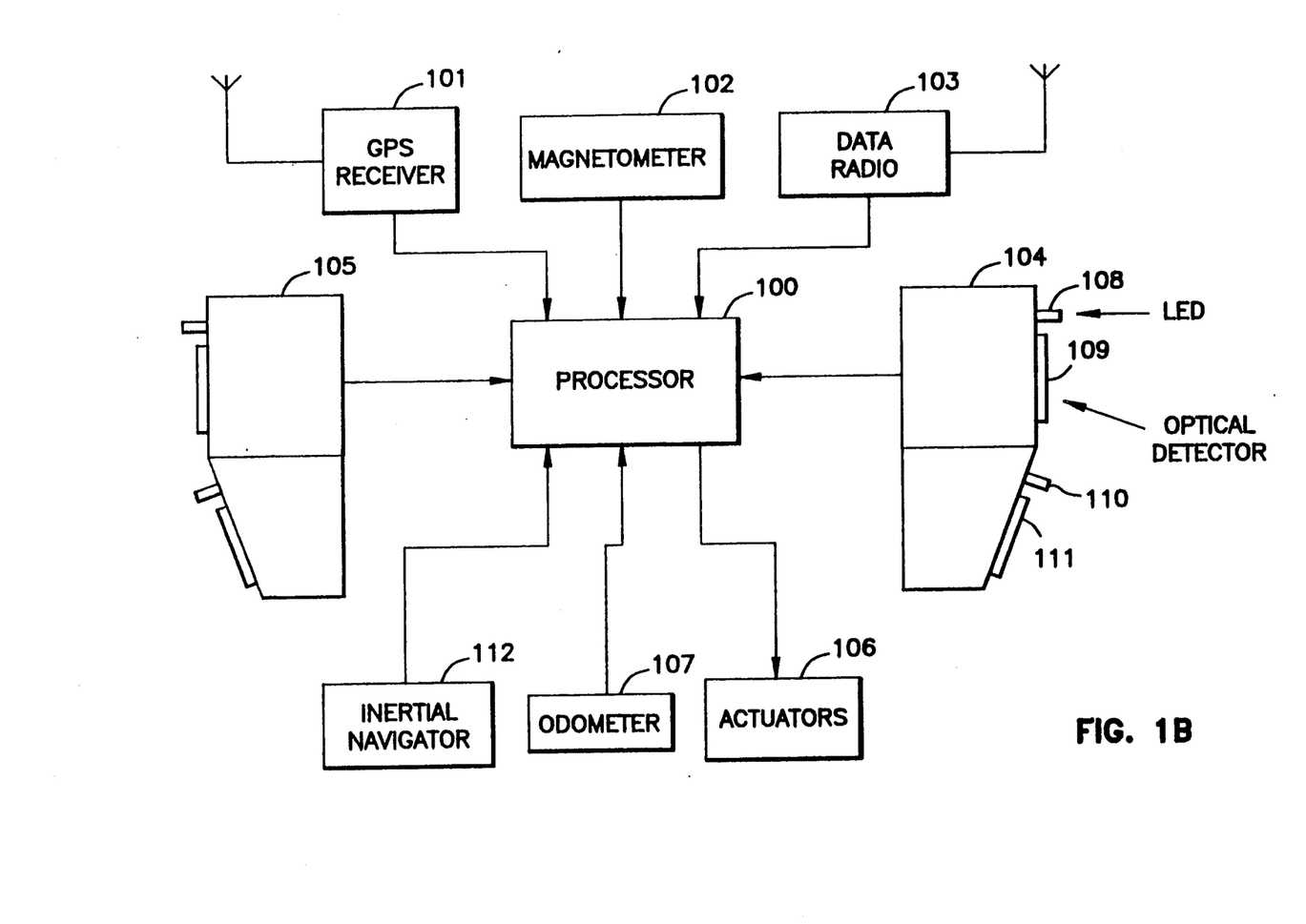
FIG. 1B is a preferred block diagram of an active cross path correlation system.

FIG. 1B shows a preferred block diagram of the present system. The block diagram represents the hardware portion of the system contained in both the lead and follower vehicles. Firmware for the system may be tailored to the individual requirements of the lead and follower vehicles, and this is further explained below.

The following is a brief explanation of the components in the block diagram of FIG. 1B along with the type of each particular component used in the preferred embodiment.

Processor 100, preferably implemented with a Motorola VME Processor, receives data from various inputs, processes the data, and controls various peripheral devices. In the lead vehicle, for example, processor 100 creates the data file containing position information and transmits the file to the follower. In the follower vehicle, processor 100 correlates gathered data with stored position information and outputs control signals to vehicle actuators.

Global Positioning Sensor (GPS) Receiver 101 and Magnetometer 102 are used for gathering heading information. A Lowrance device, product no. 000-0094-02, preferably implements the GPS Receiver 101. A Watson Industries device, product no. FGM-100A, preferably implements the Magnetometer 102.

Inertial Navigator 112 is used to obtain an orientation reference. It may be used to guide the follower vehicle in the absence of side range data, such as on a featureless plane. The inertial navigator could replace the magnetometer and odometer as a more accurate way of obtaining the same type of data. A Honeywell, Inc. HG1050 navigator preferably implements the inertial navigator.

Data Radio 103, preferably implemented with a SINCGARS radio, transmits and receives data between the lead and follower vehicles.

Position Sensors 104 and 105 utilize active radiation sources, such as lasers or LEDs, along with receivers to detect objects on either side of the vehicles and transmits signals to processor 100 that represent the distance between the vehicle and side objects. Each sensor 104 and 105 preferable has a pair of emitters and receivers for use with varying types of roads to insure that the system may consistently gather side range information.

Figure 2A:
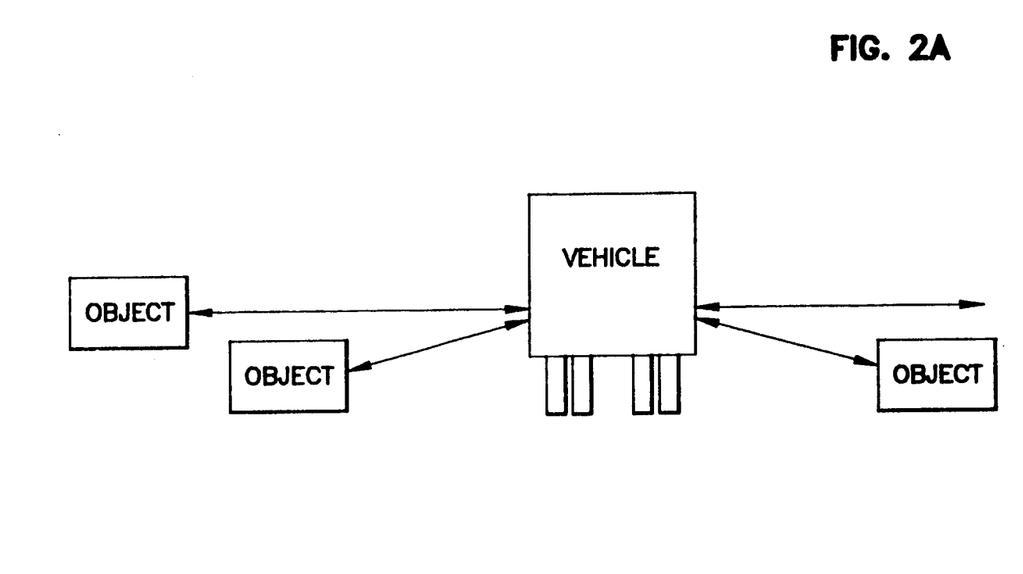
FIG. 2A is a diagram representing side ranging of the system for a normal road.
Figure 2B:
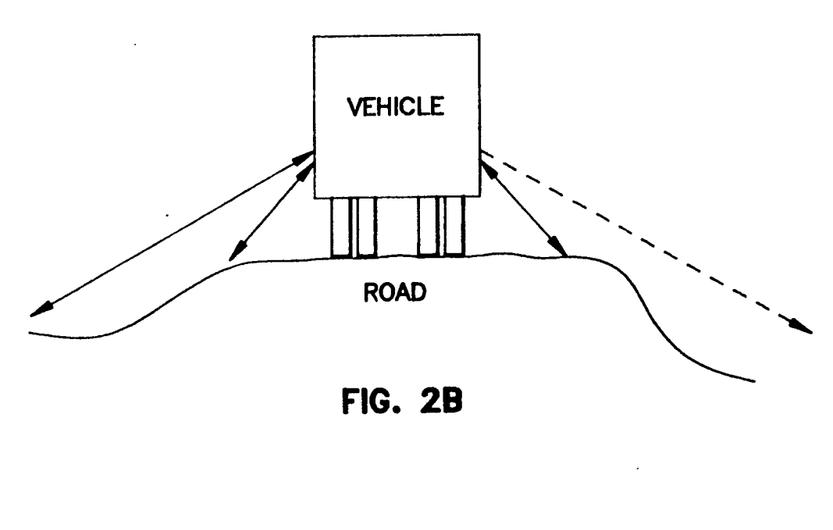
FIG. 2B is a diagram representing side ranging of the system for a high road.

Emitter 108 and corresponding receiver 109 may be used on normal roads where side objects on approximately on the same horizontal plane as the vehicle. This situation is illustrated in FIG. 2A. For high roads, the system may use emitter 110 and receiver 111 where side objects are on a lower horizontal plane than the vehicle, which is illustrated in FIG. 2B. In the preferred embodiment, a Schwartz LRF 250 Electro Optic Laser implements the emitters 108 and 110. While the system is shown as using a single beam on either side of the vehicle, it may also be implemented using multiple beams on each side of the lead and follower vehicles.

Odometer 107 is a typical distance measuring device well-known to those skilled in the art. The system may use odometer 107 to track distance along the desired path. The follower vehicle, for example, may use readings from the odometer to determine the point along the path at which the system should correlate gathered data with data received from the lead vehicle.

Actuators 106 are peripheral output devices used by the system to control to motion of the follower vehicle. The follower vehicle's system may be interfaced via actuators 106 to the vehicle's steering system, throttle, and braking system to control cross-track and along-track motion and maintain the vehicle on the desired path.

Figure 3A:
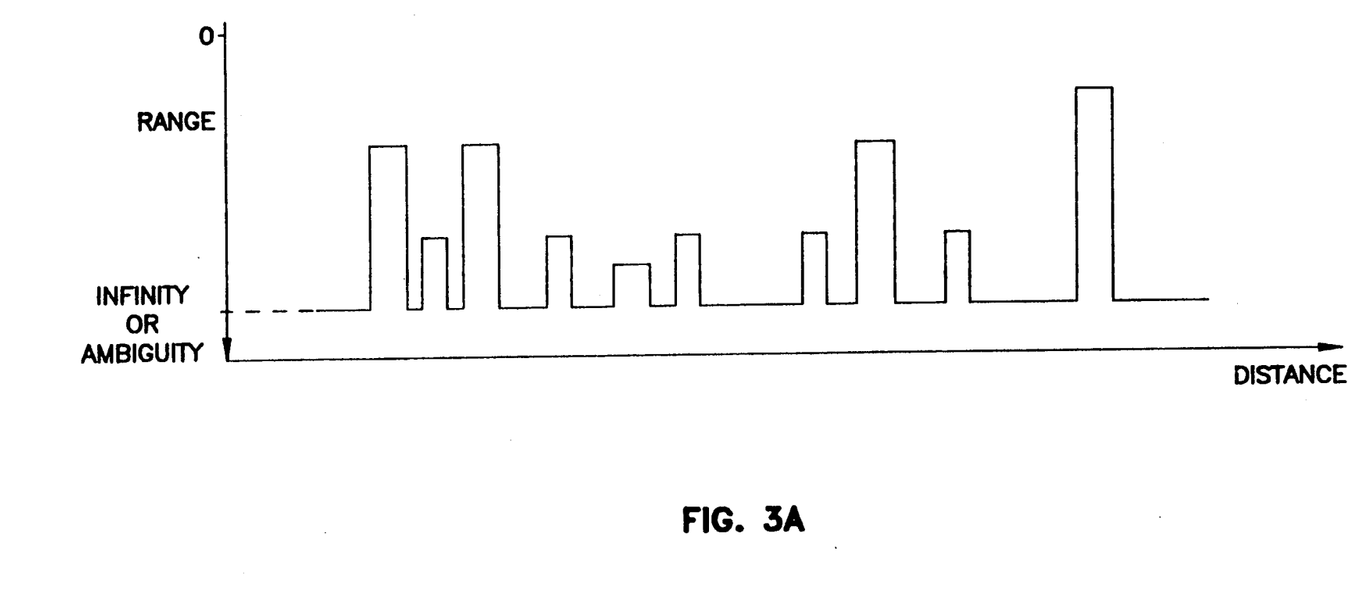
FIG. 3A is an example of a side range profile that may be generated and stored by a lead vehicle.
Figure 3B:
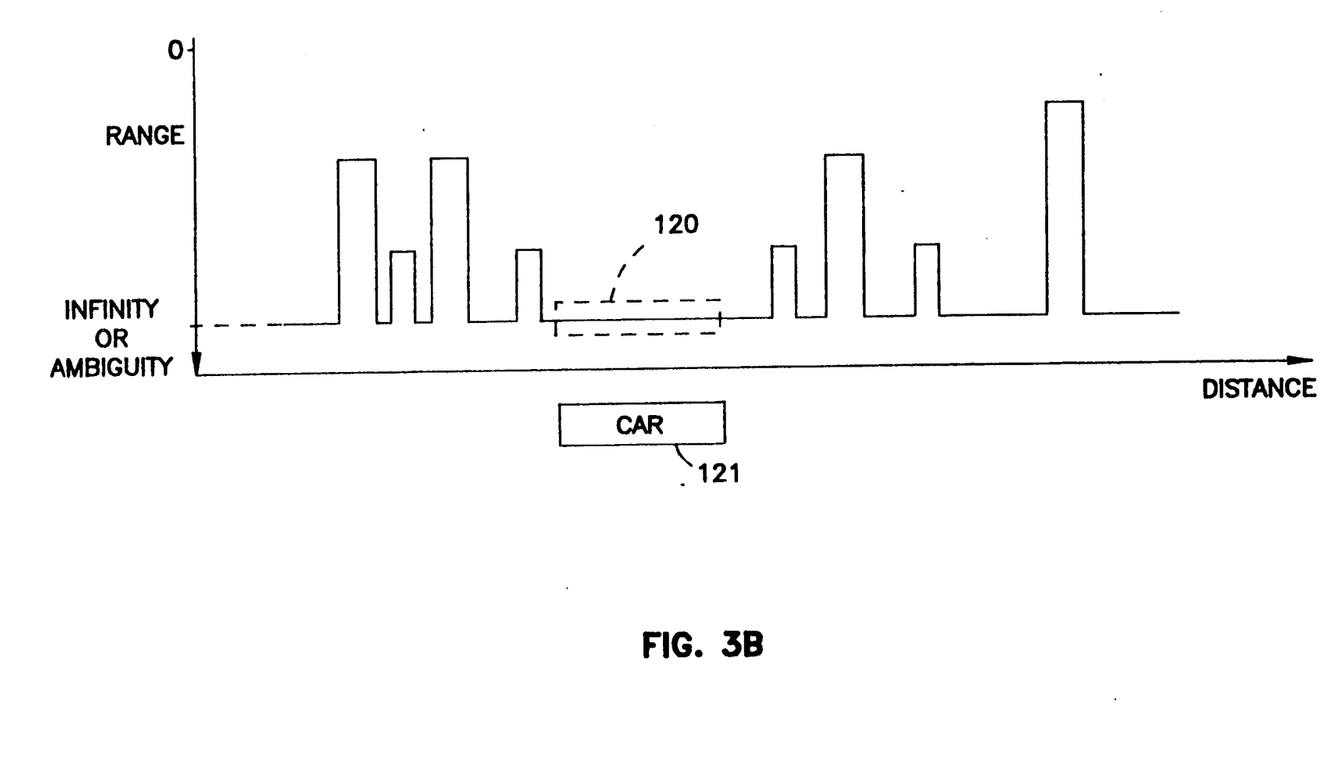
FIG. 3B is an example of a side range profile that may be generated by a follower vehicle and which illustrates a mismatch in data between the lead and follower vehicles' side range profiles along the same path.

FIGS. 3A and 3B are examples of side range profiles that will be used to illustrate the operation and advantages of the system. FIG. 3A represents a side range profile generated by a lead vehicle. The x-axis represents distance along a path, and the y-axis represents the distance (range) between the vehicle and side objects at various points along the path. The lead vehicle's system would format the side range profile into a data file and transmit it to the follower using the data radio.

FIG. 3B represents a side range profile generated by a follower vehicle that the follower vehicle's system will use in correlating the profile received from the lead vehicle. To illustrate the usefulness of the correlation techniques, consider a change in side profile data generated by the follower vehicle. For example, as the follower vehicle gathers data, a car 121 may drive by the follower and momentarily obstruct the side ranging emitters. The obstruction will result in a portion of the side range profile 120 that differs from the lead vehicle's profile.

After the data mismatch 120, the follower vehicle's system will continue gathering data, and the new data will form a pattern that now matches the lead vehicle's side range profile. The follower vehicle's system must account for the data mismatch and determine where the vehicle is on the path. In other words, the system must determine where the new data pattern is situated along the x-axis to accurately represent the lead vehicle's path. The follower vehicle's system may achieve this by continuously correlating new gathered data with the lead vehicle's profile to determine where the new data pattern fits along the x-axis and thus determine where the follower vehicle is along the path. As a result of the correlation, the system may also direct and return the follower vehicle to the lead vehicle's path.

LEAD VEHICLE

The lead vehicle's system is responsible for gathering data, which includes representations of side range profiles along the desired path, and for transmitting that data to the follower vehicle.

Figure 4:
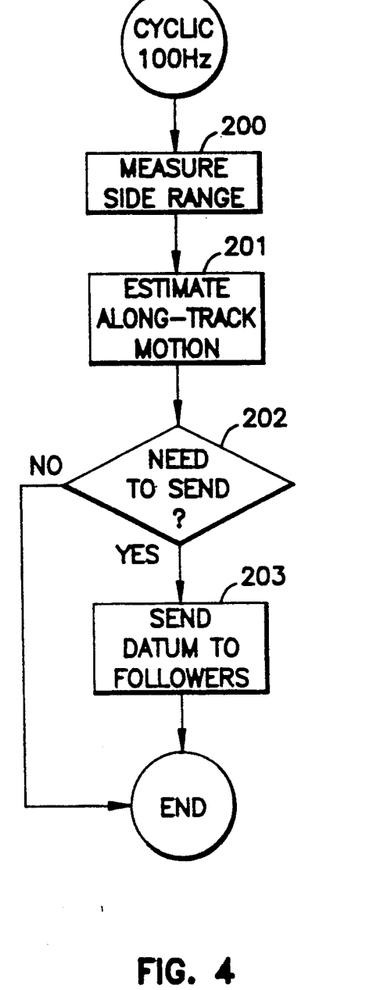
FIG. 4 is a preferred data flow through a process of lead vehicle side range profile recording.

FIG. 4 is a flow chart showing a preferred sequence of operations performed by the lead vehicle in gathering data. A typical frequency for data gathering is 100 Hz. The main criteria for the frequency value is to insure that the data gathering is scheduled at intervals consistent with the dispersion pattern of the range sensor and maximum vehicle speed so that the small objects are not missed.

At step 200, the system uses the side ranging LEDs and sensors, such as elements 108 and 109, to measure the instantaneous distance between the vehicle and objects on one or both sides of the vehicle. At step 201, the system uses an odometer or other type of position sensor to estimate the distance traveled or time elapsed since the last measurement.

The system evaluates the present gathered data with the previous data measurement at step 202 to determine if the system needs to send new data to the follower vehicle. If there has been no significant change in side range data from the last measurement, the system may not send new side range data; otherwise, the system may transmit the new position measurement data to the follower vehicle. Even though the system may not transmit unchanged data, the system could either save the new data or not save the unchanged range data and thus optimize data bandwidth.

At step 203, the system transmits to the follower vehicle the new side range data and along-path distance since the last measurement. The along-path distance is a method of "tagging" the new side range data so that the follower vehicle's system will know when it should attempt to correlate the new side range data with its own gathered data. The lead vehicle's system will also transmit X, Y position estimates if a navigator is used.

Figure 5:
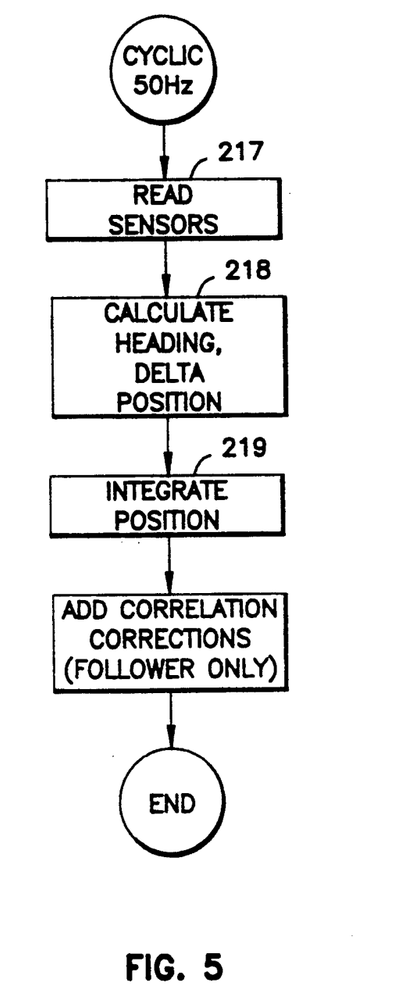
FIG. 5 is a preferred data flow through a process of lead and follower vehicle navigator position estimating.

FIG. 5 is a flow chart showing a preferred sequence of operations for the navigator position estimating. A typical frequency of the navigator position data gathering is 50 Hz, which is adequate for land vehicles. Beginning at step 217, the system reads heading and distance-traveled sensors. The heading is the position of the vehicle relative to the angle of the sensor to the recorded object. The system preferably uses heading data because the lead and follower vehicle's sensors may detect the same object from different angles, and the system should account for this in order to maximize the accuracy in tracking the lead vehicle's path. At step 218, the system calculates the heading and delta position. If X, Y magnetometers are used, the following are the position calculations:

$$Heading = (four\ quadrant)\ arctangent(Y/X)$$

$$Delta\ X = distance * sin(heading)$$

$$Delta\ Y = distance * cos(heading)$$

At step 219, the system accumulates X and Y Deltas to form an estimate of the vehicle's relative position, which means that "ground truth" or the actual physical location is not necessary as long as the lead and follower vehicles are initialized to the same approximate starting point. Finally, at step 213, the system performs any necessary corrections on the position data by using cross-track and along-track correlation errors to zero-out differences between the lead and follower vehicles' navigators. The lead vehicle's position is typically used as the reference point.

FOLLOWER VEHICLE

Figure 6:
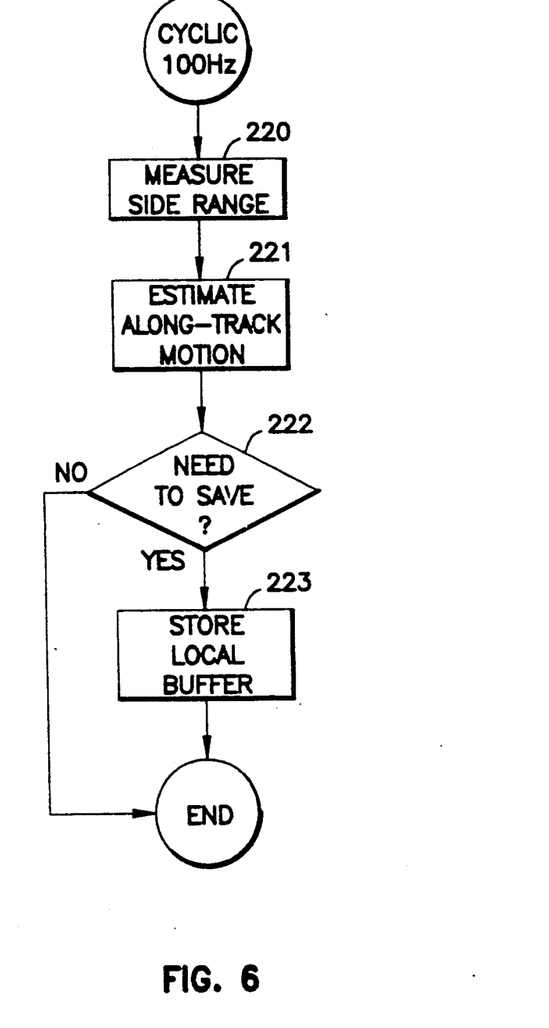
FIG. 6 is a preferred data flow through a process of follower vehicle side range profile recording.

FIG. 6 is a flow chart showing a preferred sequence of operations for recording a side range profile of the follower vehicle. The sequence of operations is similar to the lead vehicle's side range profile generation. The follower vehicle's system also operates at a typical frequency of 100 Hz, which is a sufficiently high rate to avoid missing small objects. At step 220, the system measures the distance between the follower vehicle and objects on one or more sides of the vehicle. At step 221, the system estimates along-path position using an odometer or other type of position sensor. The system compares the new gathered position data with previous position data at step 222, and, if necessary, stores the new position data at step 223.

Figure 7:
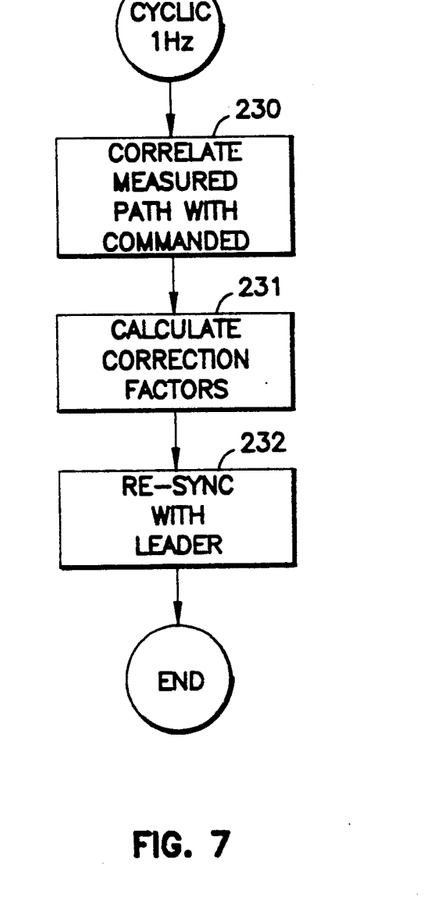
FIG. 7 is a preferred data flow through a process of follower vehicle along-track position estimate correlation.

FIG. 7 is a flow chart showing a preferred sequence of operations for along-track position estimate correlation in the follower vehicle. With these operations, the follower vehicle's system correlates gathered position data with stored or received position data from the lead vehicle so that the system may determine where the follower vehicle is in relation to the lead vehicle's path.

The system typically performs the correlation at a frequency of 10 Hz. The required frequency will depend upon the amount by which the follower vehicle drifts from the lead vehicle's path. The frequency should be such that the correlation is scheduled at intervals sufficient to maintain the follower vehicle substantially on the lead vehicle's path.

At step 230, the system correlates the side range position data sent from the lead vehicle with the side range profile generated by the follower vehicle. The result of the correlation will indicate to the follower its position relative to the lead vehicle's path. The correlation may be accomplished with a pattern matching algorithm such as a two-dimensional modification of the cruise missile terrain matcher. In the preferred embodiment, the following represents an implementation of the correlation:

---

Along-track correlation algorithm for active cross-path system.

---

Description

Essentially, this algorithm takes a segment of the side-range profile generated by the follower vehicle and "slides" it ahead and behind the estimated position with respect to the recorded side-range position of the lead vehicle. The best match may be found using a least-squares metric.

---

| | Parameters |
|---|---|
| Let L[ ] | be an array containing leader vehicle side-ranges measured at some fixed interval. |
| Let F[ ] | be an array containing follower vehicle side-ranges, with F[0 ] the most recent side range. |
| Let N[ ] | be the length of the profile to match |
| Let S[ ] | be the number of samples to "slide" ahead and behind the current estimate of position |
| Let P[ ] | be the current estimate of F[0] corresponding to L[ ]. i.e., F[0] = L[P] if there are no errors. |

Algorithm

```
begin Correlate
    Error:= Machine_Infinity;
    New_Best := P;
    for Index in (P - S) to (P + S) loop
        Sum := 0;
        for N1 in 0 to N loop
            Sum := Sum + ((L[N1] - F[N1]+Index]) ** 2);
        end loop N1;
        if Sum < Error then
            Error := Sum;
            New_Best := Index;
        end if;
    end loop index;
    P := New_Best;
end Correlate;
```

---

At step 231, the system utilizes the results of the correlation to calculate the difference between the actual follower vehicle position relative to the stored side range profile received from the lead vehicle and the estimated position derived from the gathered data. The on-board sensors generate the gathered data, which is then formatted into a side range profile. At step 232, the system uses the correction factors to update the local estimates of position to correspond to the stored or received position data from the lead vehicle.

Figure 8:
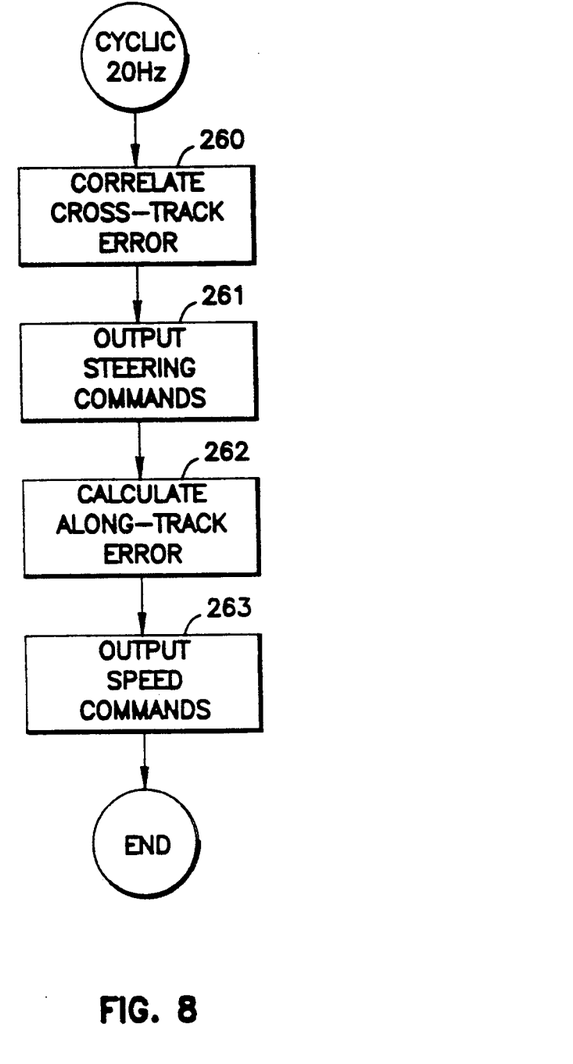
FIG. 8 is a preferred data flow through a process of follower vehicle control output calculations.

FIG. 8 is a flow chart showing a preferred sequence of operations for calculating vehicle control outputs to maintain the follower vehicle on the lead vehicle's path. The system, in knowing the along-track position estimate (FIG. 7), may determine side range errors to make corrections in the follower vehicle's along-track and cross-track motion.

At step 260, the system calculates cross-track errors in the follower vehicle's position by correlating side range data. The cross-track errors are the difference between the side range recorded by the lead vehicle at a particular along-track position and the side range measured by the follower vehicle at that position. Once the system has calculated the cross-track error, the system outputs steering commands to the follower vehicle's control actuators at step 261. By controlling the vehicle's steering, the actuators may control the side-to-side (cross-track) motion of the follower vehicle and thus maintain it on the lead vehicle's path.

At step 262, the system calculates along-track errors in the follower vehicle's position by correlating along-track data. The along-track errors are the difference between the distance traveled along the path by the follower vehicle and the lead vehicle's most recently transmitted, or current, position from the desired spacing between the vehicles. Once the system has calculated the along-track error, the system outputs commands to actuators which control the follower vehicle's braking system and throttle at step 263. By controlling the vehicle's accelerator and brake, the actuators may control the spacing between vehicles along the path.

ALTERNATE EMBODIMENT

The present invention has been described as embodied in a follower vehicle immediately following behind a lead vehicle down a desired path. Alternatively, the present invention may be embodied in a lead vehicle which first traverses a desired path and records position data, and a follower vehicle which later downloads the position data and traverses the path without requiring further position data from the lead vehicle as it travels along the path. As an example, a recording (lead) vehicle may first travel from one city to another, gathering and recording position data along the way. Later, any number of follower vehicles may load the recorded position data and "play back" the position data as the follower vehicles travel between the two cities and correlates the recorded data with gathered data to traverse the same path as the recording vehicle.

The alternate embodiment requires the following modifications to the embodiment described above to replay a path recorded at a previous time. First, the lead vehicle, which is now the recording vehicle, should save its estimate of speed at each recorded data point, in addition to the other parameters described above. For each recorded data point, the follower vehicle's desired speed will preferably be the speed of the recording vehicle at the same point along the path. Second, a more sophisticated clutter-rejection filter should be used with the data gathering sensors to ignore new or missing objects in a relatively uncontrolled environment. For example, a parked car may be added to or removed from the scene between the times that the recording and follower vehicles traverse the path. Finally, the follower may comprise an obstacle-avoidance sensor to account for obstructions that are added to the path. This sensor is typically not required in the preferred embodiment because, in comparison, it is reasonably safe to assume in a same-time setting that no obstructions appear in the short time interval after the lead vehicle passes but before the follower vehicle arrives at a particular location.

While the present invention has been described in connection with the preferred embodiment thereof, it will be understood that many modifications will be readily apparent to those skilled in the art, and this application is intended to cover any adaptations or variations thereof. For example, the preferred embodiment has been described in terms of a single follower vehicle following behind a lead vehicle. However, multiple follower vehicles may receive data from the lead vehicle and follow the lead vehicle along a desired path.

It is manifestly intended that this invention be limited only by the claims and equivalents thereof.

What is claimed is:

1. A system for controlling a follower vehicle based upon data that represents first and second side range profiles along a predefined path, comprising:
   a) generation means for gathering data and for generating the first and second side range profiles, comprising:
      i) first profile generation means for generating the first side range profile representing first distances between a lead vehicle and objects to a side of the lead vehicle, measured laterally from the predefined path, at various points along the predefined path; and
      ii) second profile generation means for generating the second side range profile representing second distances between the follower vehicle and the objects to a corresponding side of the follower vehicle at various points along the predefined path;
   b) correlation means for correlating the first side range profile with the second side range profile and for determining therefrom a location of the follower vehicle along the predefined path; and
   c) control means for controlling the follower vehicle in response to the correlation means such that the follower vehicle traverses the predefined path.

2. The system of claim 1 wherein the second profile generation means comprises:
   a) processing means for receiving, transmitting, and processing data; and
   b) active signal means, coupled to the processing means, for measuring the second distances between the follower vehicle and the objects to the side of the follower vehicle and for transmitting signals to the processing means that represent the second distances.

3. The system of claim 1 wherein the first profile generation means comprises:
   a) processing means for receiving, transmitting, and processing data; and
   b) active signal means, coupled to the processing means, for measuring the first distances between the lead vehicle and the objects to the side of the lead vehicle and for transmitting signals to the processing means that represent the first distances.

4. The system of claim 1 wherein the first profile generation means comprises tagging means for associating with the first side range profile a parameter indicating a relative point along the predefined path where the lead vehicle obtained one or more of the first distances in the first side range profile.

5. The system of claim 4 wherein the tagging means comprises means for associating with the first side range profile an elapsed time between at least two of the first distance measurements.

6. The system of claim 4 wherein the tagging means comprises means for associating with the first side range profile an along-path distance traveled by the lead vehicle between two points along the predefined path corresponding to two of the first distance measurements.

7. The system of claim 2 wherein the active signal means comprises:
   a) means for transmitting an electromagnetic signal to the objects on the side of the follower vehicle; and
   b) receiver means for receiving an electromagnetic signal reflected from the objects.

8. The system of claim 7 wherein the means for transmitting an electromagnetic signal comprises a light-emitting diode for transmitting a light signal.

9. The system of claim 2 wherein the active signal means comprises:
   a) means for transmitting an acoustic signal to the objects on the side of the follower vehicle; and
   b) receiver means for receiving an acoustic signal reflected from the objects.

10. The system of claim 7 wherein the active signal means comprises means for transmitting the electromagnetic signal substantially parallel to a surface on which the follower vehicle is traveling.

11. The system of claim 7 wherein the active signal means comprises means for transmitting the electromagnetic signals at a downward angle from the follower vehicle.

12. The system of claim 2 wherein the generation means further comprises heading means, coupled to the processing means, for gathering heading information.

13. The system of claim 12 wherein the heading means comprises a Global Positioning System sensor and a magnetometer.

14. The system of claim 1 wherein the correlation means comprises along-path distance measuring means for measuring a point on the predefined path at which the correlation means should correlate the first and second side range profiles.

15. The system of claim 14 wherein the distance measuring means comprises an odometer.

16. The system of claim 1 wherein the first profile generation means comprises communication means for transmitting the first side range profile to the follower vehicle as the follower vehicle traverses the predefined path.

17. The system of claim 16 wherein the communication means comprises a radio.

18. The system of claim 1 wherein in the first profile generation means comprises recording means for storing the first side range profile onto a storage medium.

19. The system of claim 18 wherein the generation means comprises means for receiving the first side range profile from the storage medium and for storing the first side range profile within the follower vehicle.

20. The system of claim 18 wherein the storage medium comprises a disk of magnetic material.

21. The system of claim 1 wherein the control means comprises steering means for controlling cross-track motion of the follower vehicle.

22. The system of claim 21 wherein the steering means comprises an actuator coupled to a steering system of the follower vehicle.

23. The system of claim 1 wherein the control means comprises speed means for controlling along-track motion of the follower vehicle.

24. The system of claim 23 wherein the speed means comprises actuators coupled to a braking system and throttle of the follower vehicle.

25. A process for controlling cross-track and along-track motion of a follower vehicle along a predefined path, comprising the steps of:
   a) generating a first side range profile that represents distances between a lead vehicle and objects to a side of the lead vehicle, measured laterally from the predefined path, at various points along the predetermined path;
   b) providing the follower vehicle with the first side range profile;
   c) gathering data to generate a second side range profile that represents distances between the follower vehicle and the objects to a corresponding side of the follower vehicle at various points along the predefined path;
   d) correlating the first and second side range profiles to determine a position of the follower vehicle on the predefined path;
   e) generating error signals that represent an amount by which the follower vehicle has drifted from the predefined path; and
   f) outputting correction signals to control the side-track and along-track motion of the follower vehicle and to maintain the follower vehicle on the predefined path.

26. The process of claim 25 wherein the gathering data step (b) comprises the steps of:
   a) measuring side range data; and
   b) measuring along-track motion.

27. The system of claim 25 wherein the outputting correction signals step (e) comprises the steps of:
   a) outputting steering commands to first actuators which control the follower vehicle's steering system; and
   b) outputting speed commands to second actuators which control the follower vehicle's braking system and throttle.

28. A system for controlling a vehicle based upon data that represents first and second side range profiles along a predefined path, comprising:
   a) generation means for gathering data and for generating the first and second side range profiles, comprising:
      i) first profile generation means for generating the first side range profile representing first distances between the vehicle and objects to a side of the vehicle, measured laterally from the predefined path, at various points along the predefined path during a first traversal of the predefined path;
      ii) recording means for storing the first side range profile in a storage medium on board the vehicle; and
      iii) second profile generation means for generating the second side range profile representing second distances between the vehicle and the objects to a corresponding side of the vehicle at various points along the predefined path during a second traversal of the predefined path;
   b) correlation means for retrieving the first side range profile from the storage medium, for correlating the first side range profile with the second side range profile, and for determining therefrom a location of the vehicle along the predefined path; and
   c) control means for controlling the vehicle in response to the correlation means such that during the second traversal of the predetermined path the vehicle does not require a human operator.

* * * * *